(12) United States Patent
Sato et al.

(10) Patent No.: US 6,679,688 B2
(45) Date of Patent: Jan. 20, 2004

(54) REED VALVE RESTRICTION PLATE WITH ANTI-STICKING MEANS

(75) Inventors: Takashi Sato, Saitama (JP); Kenzo Matsumoto, Gunma (JP); Yoshiaki Hiruma, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/076,908

(22) Filed: Feb. 14, 2002

(65) Prior Publication Data
US 2002/0119059 A1 Aug. 29, 2002

(51) Int. Cl.⁷ .............................. F04B 39/10; F16K 15/16
(52) U.S. Cl. ........................................ 417/559; 137/856
(58) Field of Search ................................ 417/507, 559; 137/856, 855

(56) References Cited

U.S. PATENT DOCUMENTS

| | | | | |
|---|---|---|---|---|
| 1,669,889 A | * | 5/1928 | Andrews et al. | 137/856 |
| 2,118,356 A | * | 5/1938 | Money | 137/856 |
| 2,302,447 A | * | 11/1942 | King et al. | 137/514 |
| 3,998,243 A | * | 12/1976 | Osterkorn et al. | 137/856 |
| 5,647,395 A | * | 7/1997 | Hashimoto et al. | 137/517 |

FOREIGN PATENT DOCUMENTS

| | | |
|---|---|---|
| JP | 57-15400 | 3/1982 |
| JP | 7-54631 | 12/1995 |

* cited by examiner

*Primary Examiner*—Justine R. Yu
*Assistant Examiner*—Timothy P. Solak
(74) *Attorney, Agent, or Firm*—Darby & Darby

(57) ABSTRACT

A refrigerant compressor has a member forming a compression chamber with a discharge port and a discharge reed valve. The reed valve has a valve cover portion at one end for opening and closing the discharge port and a portion at another end that is fixed to the member. A valve restricting plate is fixed to the member forming the compression chamber together with the fixed portion of the discharge valve so as to overlie the reed valve and to restrict the opening amount of the reed valve cover portion. The valve restricting plate has a head portion wider than a middle portion thereof which head portion opposes the valve cover portion of the discharge valve against which it can come into contact A through hole or notch is provided in the restricting plate head portion to provide back pressure flow communication that acts on the cover portion of the reed valve to prevent it from sticking to the valve restricting plate.

6 Claims, 4 Drawing Sheets ically to a discharge valve apparatus of a refrigerant compressor in which an operating characteristic of a discharge valve for opening and closing a refrigerant gas discharge port in a compression chamber is improved.

REED VALVE RESTRICTION PLATE WITH ANTI-STICKING MEANS

BACKGROUND OF THE INVENTION

The present invention relates to a refrigerant compressor used in a refrigerant cycle of a refrigerator, an air conditioning device or the like, and more particularly to a discharge valve apparatus of a refrigerant compressor in which an operating characteristic of a discharge valve for opening and closing a refrigerant gas discharge port in a compression chamber is improved.

A description will be given of the refrigerant compressor used in the refrigerant cycle of the refrigerator, the air conditioning device or the like which corresponds to a subject of the present invention on the basis of an embodiment of a closed type rotary compressor with reference to FIG. 6. A refrigerant gas having a low temperature and a low pressure flowing within an accumulator 1 is sucked into a cylinder 3 within a closed container 2 through a suction pipe 4. A suction chamber and a compression chamber (none of them are illustrated) sectioned by a vane (not shown) are formed within the cylinder 3 with respect to a roller 6 provided in the crank shaft 5, and the refrigerant gas is introduced to the compression chamber from the suction chamber so as to be compressed, and becomes a refrigerant gas having a high temperature and a high pressure.

Further, the refrigerant gas reaches a discharge muffler 9 via a discharge port 7 of a main frame 16 and a discharge valve apparatus 8A, a part thereof passes through a passage 14 between a stator 11 and a rotor 12 in a motor 10 and another part thereof passes through a passage 15 between the stator 11 and the closed container 2 so as to flow to an upper portion of the motor 10, and the refrigerant gas further flows out of the compressor through a discharge pipe 13.

FIG. 7 is an enlarged cross sectional view of a conventional discharge valve apparatus 8A, and a description will be given of the conventional discharge valve apparatus 8A. the discharge port 7 for the refrigerant gas is formed in the main frame 16. A reed-shaped discharge valve 80 made of a thin sheet member and a valve restricting plate 81 are overlapped with each other, and are adhered to a mounting hole 17 in the main frame 16 by a caulking pin 18. The refrigerant gas compressed in the compression chamber and reaching a predetermined pressure presses up a valve cover 80a of the discharge valve 80 closing the discharge port 7 from the below in the drawing so as to open the discharge port 7, and is discharged to the discharge muffler. At this time, since the discharge valve 80 is adhered to the main frame 16 in one side, a side of the valve cover 80a warps up so as to be brought into contact with the valve restricting plate 81 for restricting an opening amount of the discharge valve 80.

Since the oil mixed into the refrigerant gas is attached to the contact portion at a time when the discharge of the refrigerant gas is finished and the discharge valve 80 is going to move toward the discharge port 7 from the state of being brought into contact with the valve restricting plate 81, the discharge valve 80 is closely attached to the valve restricting plate 81 or a negative pressure is generated in the contact portion between the both. Accordingly, a valve disengagement (a matter that the discharge valve 80 moves apart from the valve restricting plate 81) is deteriorated, and a close delay of the discharge port 7 is generated. When the close delay of the discharge port 7 is generated, the refrigerant gas flows backward to the suction chamber, so that there is caused a reduction of a compression efficiency.

Accordingly, as disclosed in Japanese Utility Model Publication Nos. 57-15400 and 7-54631, in accordance with the conventional art, a plurality of through holes are provided in a thickness direction of the valve restricting plate or a rib recessed into an opposite side to the valve from the contact surface is provided in a longitudinal direction of the valve restricting plate, whereby it is possible to prevent the discharge valve from being closely attached or it is possible to prevent the negative pressure from being generated on the contact surface of the valve with the valve restricting plate, thereby improving the valve disengagement and improving a response of the discharge valve.

However, in the structure in which a plurality of through holes are provided in the thickness direction of the valve restricting plate as mentioned above, since it is necessary to widely increase the thickness in order to maintain a strength of the valve restricting plate, there is a problem that a productivity is deteriorated and a used amount of the material is increased, whereby a cost is increased.

Further, in the structure in which the rib is provided in the longitudinal direction of the valve restricting plate, since the valve restricting plate is required to have a narrow substantially rectangular and smooth warped shape, there is a problem that forming the rib in this shape has an extremely bad workability and it is hard to maintain a shape accuracy, whereby a cost is increased.

SUMMARY OF THE INVENTION

An object of the present invention is to provide a refrigerant compressor which can improve a response of a discharge valve while intending to maintain a strength and a workability of a valve restricting plate and an accuracy of finished shape without increasing a thickness.

In accordance with the present invention, there is provided a refrigerant compressor comprises a discharge port constructed in a member forming a compression chamber, a discharge vale formed in a reed shape and constituted by a valve cover portion for opening and closing the discharge port at one end and a fixed portion at another end, and a substantially rectangular valve restricting plate closely fixed to a member forming the compression chamber together with the fixed portion of the discharge valve and restricting an opening amount of a side of the valve cover portion, wherein a head portion wider than a middle portion of the valve restricting plate is provided in the valve restricting plate in a side with which the valve cover portion of the discharge valve is brought into contact, and a circular through hole is provided in the head portion. Accordingly, it is possible to well apply a back pressure to the valve cover of the discharge valve.

Further, in accordance with the present invention, there is provided a refrigerant compressor comprises a discharge port constructed in a member forming a compression chamber, a discharge vale formed in a reed shape and constituted by a valve cover portion for opening and closing the discharge port at one end and a fixed portion at another end, and a substantially rectangular valve restricting plate closely fixed to a member forming the compression chamber together with the fixed portion of the discharge valve and restricting an opening amount of a side of the valve cover portion, wherein a head portion wider than a middle portion of the valve restricting plate is provided in the valve restricting plate in a side with which the valve cover portion of the discharge valve is brought into contact, and a circular recess portion and a small hole extending from the recess portion to an opposite side to the contact surface are provided in a side of the contact surface of the head portion. Accordingly, it is possible to well apply a back pressure to the valve cover of the discharge valve.

Further, in accordance with the present invention, there is provided a refrigerant compressor comprises a discharge port constructed in a member forming a compression chamber, a discharge valve formed in a reed shape and constituted by a valve cover portion for opening and closing the discharge port at one end and a fixed portion at another end, and a substantially rectangular valve restricting plate closely fixed to a member forming the compression chamber together with the fixed portion of the discharge valve and restricting an opening amount of a side of the valve cover portion, wherein a head portion wider than a middle portion of the valve restricting plate is provided in the valve restricting plate in a side with which the valve cover portion of the discharge valve is brought into contact, and a U-shaped notch having an open front end is provided in the head portion. Accordingly, it is possible to well apply a back pressure to the valve cover of the discharge valve.

Further, in accordance with the present invention, there is provided a refrigerant compressor comprises a discharge port constructed in a member forming a compression chamber, a discharge valve formed in a reed shape and constituted by a valve cover portion for opening and closing the discharge port at one end and a fixed portion at another end, and a substantially rectangular valve restricting plate closely fixed to a member forming the compression chamber together with the fixed portion of the discharge valve and restricting an opening amount of a side of the valve cover portion, wherein a head portion wider than a middle portion of the valve restricting plate is provided in the valve restricting plate in a side with which the valve cover portion of the discharge valve is brought into contact, and a recess portion having a front end open to a side of the contact surface and a circular shape in a side of the fixed portion is provided in the head portion. Accordingly, it is possible to well apply a back pressure to the valve cover of the discharge valve.

Further, in accordance with the present invention, there is provided a refrigerant compressor as recited in each of the inventions mentioned above, wherein an area of the through hole, or the recess portion or the notch in the head portion of the valve restricting plate is in a range between 3 and 50% of an area of the valve cover portion in the discharge valve. Accordingly, it is possible to well apply a back pressure to the valve cover of the discharge valve.

Further, in accordance with the present invention, there is provided a refrigerant compressor as recited in each of the inventions mentioned above, wherein the through hole, or the recess portion or the notch in the head portion of the valve restricting plate is formed by being press molded from the side of the contact surface in the discharge valve. Accordingly, it is possible to prevent a convex shape from being generated on the contact surface.

DETAILED DESCRIPTION OF THE PREFERRED EMBODIMENT

Figure 6:
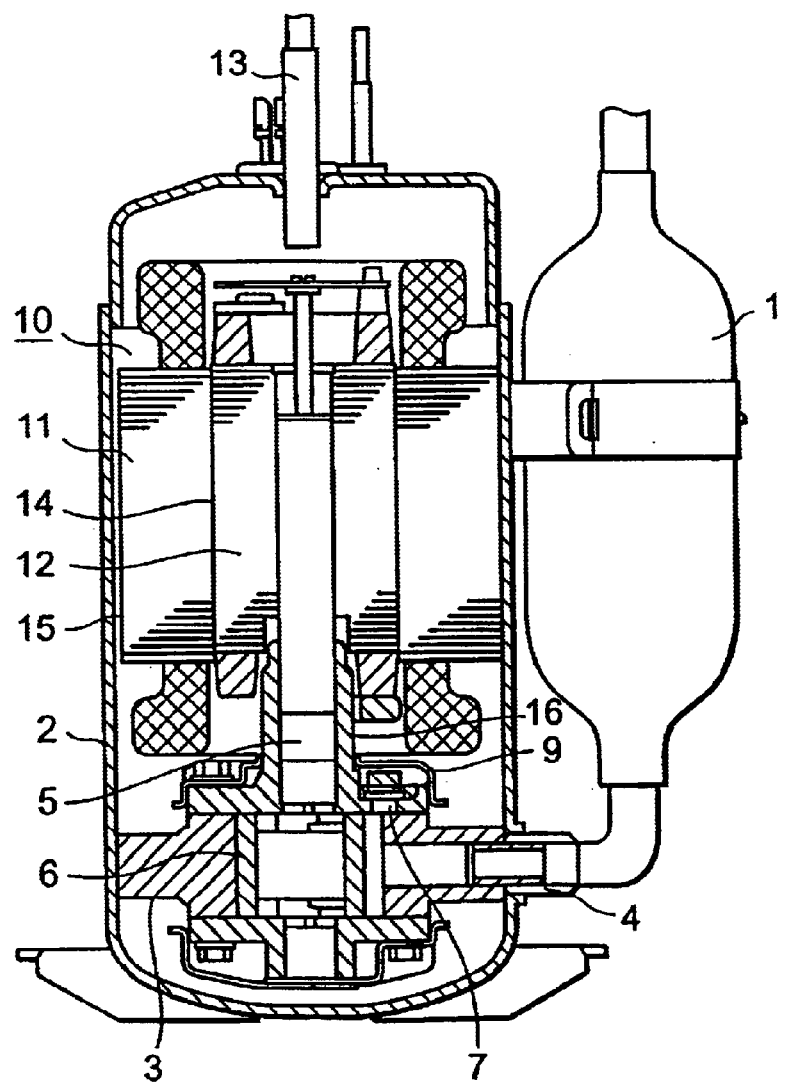
FIG. 6 is a vertical cross sectional view of a refrigerant compressor in accordance with an embodiment to which the present invention is applied.
Figure 7:
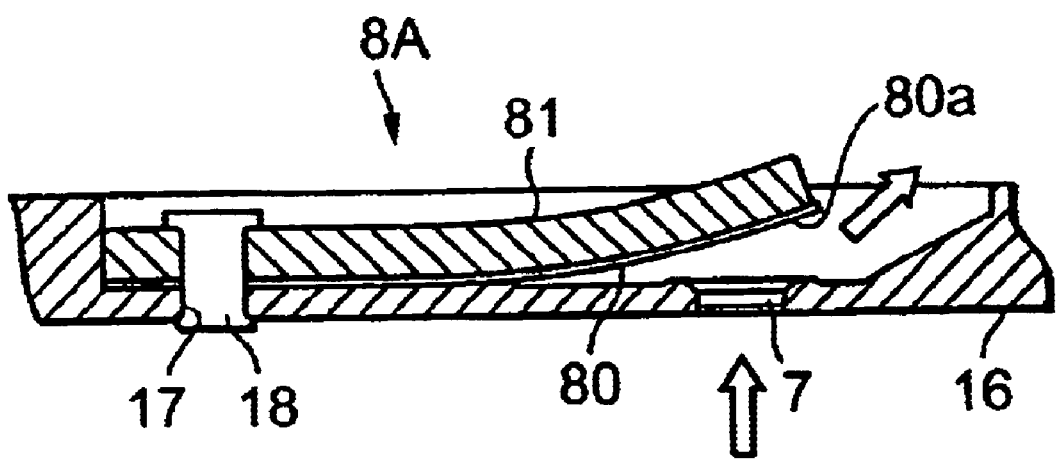
FIG. 7 is an enlarged cross sectional view of a discharge valve apparatus of a refrigerant compressor in accordance with a conventional art.

A description will be given below of an embodiment in accordance with the present invention with reference to the accompanying drawings. In this case, a whole structure of a refrigerant compressor is the same as that shown in FIG. 6. That is, a suction chamber and a compression chamber (none of them are illustrated) which are sectioned by a vane (not shown) are formed within a cylinder 3 with respect to a roller 6 provided in a crank shaft 5, and a refrigerant gas is introduced to a compression chamber from a suction chamber so as to be compressed and forms a refrigerant gas having a high temperature and a high pressure.

Further, the refrigerant gas reaches a discharge muffler 9 via a discharge port of a main frame 16 and a discharge valve apparatus 8, a part thereof passes through a passage 14 between a stator 11 and a rotor 12 in a motor 10 and another part thereof passes through a passage 15 between the stator 11 and the closed container 2 so as to flow to an upper portion of the motor 10, and the refrigerant gas further flows out of the compressor through a discharge pipe 13.

Figure 1A:
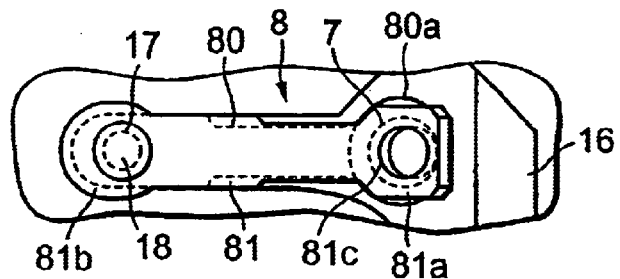
FIGS. 1A and 1B are views showing a structure of a discharge valve apparatus of a refrigerant compressor in accordance with a first embodiment of the present invention.
Figure 1B:
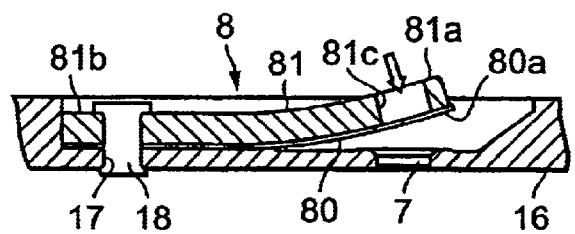

FIGS. 1A and 1B are views showing a structure of the discharge valve apparatus 8 of the refrigerant compressor in accordance with a first embodiment of the present invention. FIG. 1A is a plan view of the discharge valve apparatus 8 of the refrigerant compressor and FIG. 1B is a cross sectional view of a main portion of the discharge valve 8 portion. In the drawings, reference numeral 16 denotes a main frame, reference numeral 7 denotes a discharge port formed in the main frame, reference numeral 17 denotes a mounting hole formed in the main frame, reference numeral 18 denotes a caulking pin, reference numeral 80 denotes a discharge valve, and reference numeral 81 denotes a valve restricting plate. The discharge valve apparatus 8 is constituted by the discharge valve 80, the valve restricting plate 81, the caulking pin 18 and the like.

The main frame 16 corresponds to a member for forming a compression chamber (not shown) within a cylinder 3 by closing an opening of the cylinder 3. The discharge port 7 for discharging the refrigerant gas compressed within the compression chamber is formed in the main frame 16. The discharge valve 80 opening and closing the discharge port 7 is formed in a reed shape made of a thin sheet member, and has a substantially circular valve cover 80a portion opening and closing the discharge port 7 in one end and a fixed portion for being fixed to the main frame 16 in another end.

The valve restricting plate 81 is formed in a rectangular shape similar to the discharge valve 80, overlaps a fixed portion 81b of the valve restricting plate 81 on the fixed portion of the discharge valve 80, and is adhered to the mounting hole 17 of the main frame 16 by a caulking pin 18. An opposite side to the fixed portion in the valve restricting plate 81 is provided with a head portion 81a wider than an intermediate portion, has a shape smoothly warped up from a middle of the intermediate portion, and restricts an opening amount of the valve cover 80a portion of the discharge valve 80. Further, a circular through hole 81c is provided in the head portion 81a of the valve restricting plate 81.

In the discharge valve apparatus 8 structure in the manner mentioned above, the compressed refrigerant gas presses up the valve cover 80a of the discharge valve 80 opening the discharge port 7 from the below in the drawing so as to bring the discharge valve 80 into contact with the valve restricting plate 81. Since the oil mixed into the refrigerant gas is attached to the contact portion at a time when the discharge of the refrigerant gas is thereafter finished and the discharge valve 80 is going to move toward the discharge port 7 from the valve restricting plate 81, there is a problem that the discharge valve 80 is closely attached to the valve restricting plate 81 or a negative pressure is generated in the contact portion, whereby a valve disengagement is deteriorated.

When the valve disengagement is deteriorated, the refrigerant gas flows backward to the suction chamber due to a close delay of the discharge port 7, thereby causing a reduction of a compression efficiency. However, in accordance with the present invention, since the circular through hole 81c is provided in the head portion 81a corresponding to the maximum area portion of the valve restricting plate 81 with which the discharge valve 80 is brought into contact, it is possible to well apply a back pressure to the valve cover 80a of the discharge valve 80 by the gas introduced from the opposite side of the discharge valve. Due to the back pressure, the discharge valve 80 can easily move apart from the contact surface of the valve restricting plate 81.

Accordingly, since it is possible to improve a response of the discharge valve, it is possible to increase a compression efficiency of a whole of the refrigerant compressor.

Figure 2A:
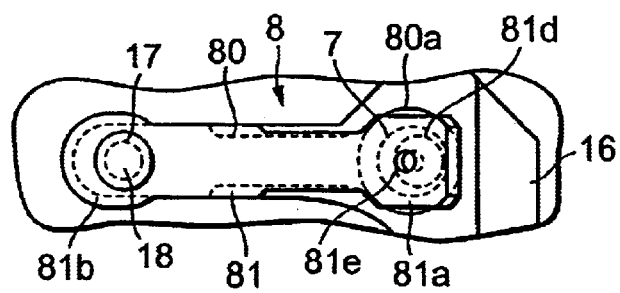
FIGS. 2A and 2B are views showing a structure of a discharge valve apparatus of a refrigerant compressor in accordance with a second embodiment of the present invention.
Figure 2B:
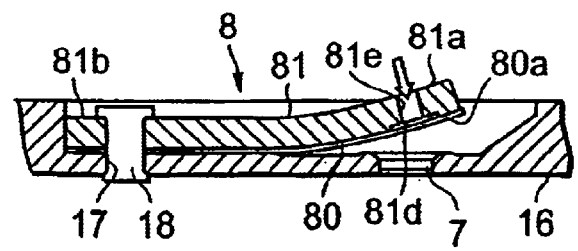

FIGS. 2A and 2B are views showing a structure of the discharge valve apparatus 8 of the refrigerant compressor in accordance with a second embodiment of the present invention. FIG. 2A is a plan view of the discharge valve apparatus 8 of the refrigerant compressor and FIG. 2B is a cross sectional view of a main portion of the discharge valve 8 portion. In the drawings, reference numeral 16 denotes a main frame, reference numeral 7 denotes a discharge port formed in the main frame, reference numeral 17 denotes a mounting hole formed in the main frame, reference numeral 18 denotes a caulking pin, reference numeral 80 denotes a discharge valve, and reference numeral 81 denotes a valve restricting plate. The discharge valve apparatus 8 is constituted by the discharge valve 80, the valve restricting plate 81, the caulking pin 18 and the like.

The main frame 16 corresponds to a member for forming a compression chamber (not shown) within a cylinder 3 as described above. The discharge port 7 for discharging the refrigerant gas compressed within the compression chamber is formed in the main frame 16. The discharge valve 80 opening and closing the discharge port 7 is formed in a reed shape made of a thin sheet member, and has a substantially circular valve cover 80a portion opening and closing the discharge port 7 in one end and a fixed portion for being fixed to the main frame 16 in another end.

The valve restricting plate 81 is formed in a rectangular shape similar to the discharge valve 80, overlaps a fixed portion 81b of the valve restricting plate 81 on the fixed portion of the discharge valve 80, and is adhered to the mounting hole 17 of the main frame 16 by a caulking pin 18. An opposite side to the fixed portion in the valve restricting plate 81 is provided with a head portion 81a wider than an intermediate portion, has a shape smoothly warped up from a middle of the intermediate portion, and restricts an opening amount of the valve cover 80a portion of the discharge valve 80. Further, a circular recess portion 81d and a small hole 81e extending through from the recess portion 81d to the opposite side of the discharge valve are provided in the side of the discharge valve 80 in the head portion 81a of the valve restricting plate 81.

In the discharge valve apparatus 8 structure in the manner mentioned above, the compressed refrigerant gas presses up the valve cover 80a of the discharge valve 80 closing the discharge port 7 from the below so as to bring the discharge valve 80 into contact with the valve restricting plate 81. Since the oil mixed into the refrigerant gas is attached to the contact portion at a time when the discharge of the refrigerant gas is thereafter finished and the discharge valve 80 is going to move toward the discharge port 7 from the valve restricting plate 81, there is a problem that the discharge valve 80 is closely attached or a negative pressure is generated in the contact portion, whereby a valve disengagement is deteriorated.

When the valve disengagement is deteriorated, the refrigerant gas flows backward to the suction chamber due to a close delay of the discharge port 7, thereby causing a reduction of a compression efficiency. However, in accordance with the present invention, since the circular recess portion 81d and the small hole 81e extending through from the recess portion 81d to the opposite side of the discharge valve are provided in the head portion 81a corresponding to the maximum area portion of the valve restricting plate 81 with which the discharge valve 80 is brought into contact, it is possible to well apply a back pressure to the valve cover 80a of the discharge valve 80 by the gas introduced from the opposite side of the discharge valve. Further, due to the back pressure, the discharge valve 80 can easily move apart from the contact surface of the valve restricting plate 81.

Accordingly, since it is possible to improve a response of the discharge valve, it is possible to increase a compression efficiency of a whole of the refrigerant compressor.

Figure 3A:
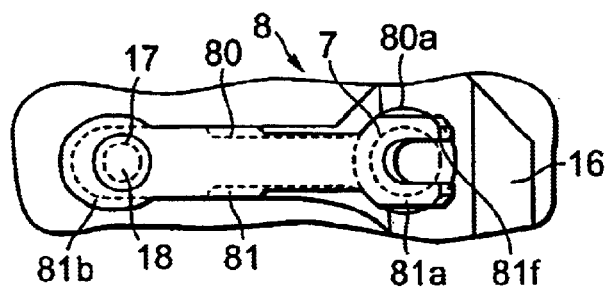
FIGS. 3A and 3B are views showing a structure of a discharge valve apparatus of a refrigerant compressor in accordance with a third embodiment of the present invention.
Figure 3B:
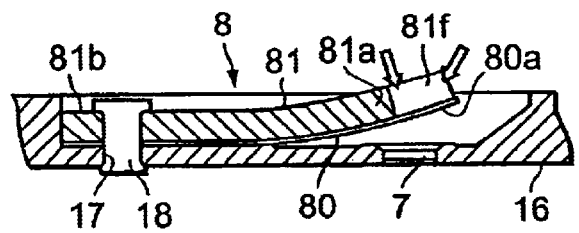

FIGS. 3A and 3B are views showing a structure of the discharge valve apparatus 8 in accordance with a third embodiment of the present invention. FIG. 3A is a plan view of the discharge valve apparatus 8 of the refrigerant compressor and FIG. 1B is a cross sectional view of a main portion of the discharge valve 8 portion. In the drawings, reference numeral 16 denotes a main frame, reference numeral 7 denotes a discharge port formed in the main frame, reference numeral 17 denotes a mounting hole formed in the main frame, reference numeral 18 denotes a caulking pin, reference numeral 80 denotes a discharge valve, and reference numeral 81 denotes a valve restricting plate. The discharge valve apparatus 8 is constituted by the discharge valve 80, the valve restricting plate 81, the caulking pin 18 and the like.

The main frame 16 corresponds to a member for forming a compression chamber (not shown) in the same manner, and the discharge port 7 for discharging the refrigerant gas compressed within the compression chamber is formed in the main frame 16. The discharge valve 80 opening and closing the discharge port 7 is formed in a reed shape made of a thin sheet member, and has a substantially circular valve cover 80a portion opening and closing the discharge port 7 in one end and a fixed portion for being fixed to the main frame 16 in another end.

The valve restricting plate 81 is formed in a rectangular shape similar to the discharge valve 80, overlaps a fixed portion 81b of the valve restricting plate 81 on the fixed portion of the discharge valve 80, and is adhered to the mounting hole 17 of the main frame 16 by a caulking pin 18. An opposite side to the fixed portion in the valve restricting plate 81 is provided with a head portion 81a wider than an intermediate portion, has a shape smoothly warped up from a middle of the intermediate portion, and restricts an opening amount of the valve cover 80a portion of the discharge valve 80. Further, a U-shaped notch 81f having an open front end is provided in the head portion 81a of the valve restricting plate 81.

In the discharge valve apparatus 8 structure in the manner mentioned above, the compressed refrigerant gas presses up the valve cover 80a of the discharge valve 80 closing the discharge port 7 from the below in the drawing so as to bring the discharge valve 80 into contact with the valve restricting plate 81. Since the oil mixed into the refrigerant gas is attached to the contact portion at a time when the discharge of the refrigerant gas is thereafter finished and the discharge valve 80 is going to move toward the discharge port 7 from the valve restricting plate 81, there is a problem that the discharge valve 80 is closely attached or a negative pressure is generated in the contact portion, whereby a valve disengagement is deteriorated.

When the valve disengagement is deteriorated, the refrigerant gas flows backward to the suction chamber due to a close delay of the discharge port 7, thereby causing a reduction of a compression efficiency. However, in accordance with the present invention, since the U-shaped notch 81f having the open front end is provided in the head portion 81a corresponding to the maximum area portion of the valve restricting plate 81 with which the discharge valve 80 is brought into contact, it is possible to well apply a back pressure to the valve cover 80a of the discharge valve 80 by the gas introduced from the opposite side of the discharge valve and the front end portion. Due to the back pressure, the discharge valve 80 can easily move apart from the contact surface of the valve restricting plate 81.

Accordingly, since it is possible to improve a response of the discharge valve 80, it is possible to increase a compression efficiency of a whole of the compressor.

Figure 4A:
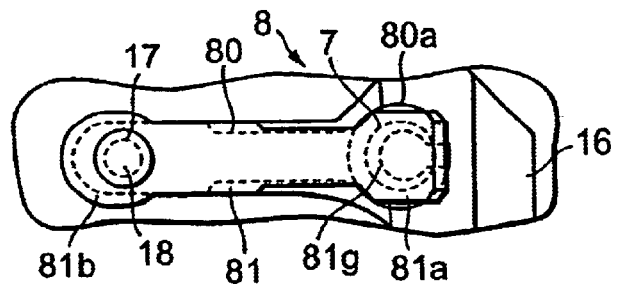
FIGS. 4A and 4B are views showing a structure of a discharge valve apparatus of a refrigerant compressor in accordance with a fourth embodiment of the present invention.
Figure 4B:
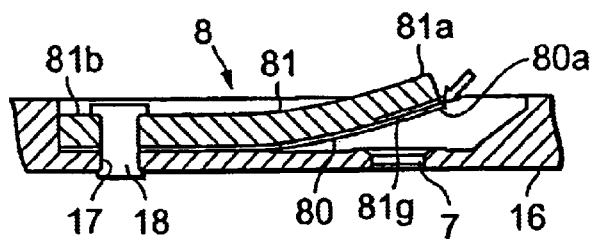

FIGS. 4A and 4B are views showing a structure of the discharge valve apparatus 8 of the refrigerant compressor in accordance with a fourth embodiment of the present invention. FIG. 1A is a plan view of the discharge valve apparatus 8 of the refrigerant compressor and FIG. 1B is a cross sectional view of a main portion of the discharge valve 8 portion. In the drawings, reference numeral 16 denotes a main frame, reference numeral 7 denotes a discharge port formed in the main frame, reference numeral 17 denotes a mounting hole formed in the main frame, reference numeral 18 denotes a caulking pin, reference numeral 80 denotes a discharge valve, and reference numeral 81 denotes a valve restricting plate. The discharge valve apparatus 8 is constituted by the discharge valve 80, the valve restricting plate 81, the caulking pin 18 and the like.

The main frame 16 corresponds to a member for forming a compression chamber (not shown) in the same manner as described above. The discharge port 7 for discharging the refrigerant gas compressed within the compression chamber is formed in the main frame 16. The discharge valve 80 opening and closing the discharge port 7 is formed in a reed shape made of a thin sheet member, and has a substantially circular valve cover 80a portion opening and closing the discharge port 7 in one end and a fixed portion for being fixed to the main frame 16 in another end.

The valve restricting plate 81 is formed in a rectangular shape similar to the discharge valve 80, overlaps a fixed portion 81b of the valve restricting plate 81 on the fixed portion of the discharge valve 80, and is adhered to the mounting hole 17 of the main frame 16 by a caulking pin 18. An opposite side to the fixed portion in the valve restricting plate 81 is provided with a head portion 81a wider than an intermediate portion, has a shape smoothly warped up from a middle of the intermediate portion, and restricts an opening amount of the valve cover 80a portion of the discharge valve 80. Further, a recess portion 81g having an open front end and circular fixed portion is provided in the head portion 81a of the valve restricting plate 81.

In the discharge valve apparatus 8 structure in the manner mentioned above, the compressed refrigerant gas presses up the valve cover 80a of the discharge valve 80 closing the discharge port 7 from the below so as to bring the discharge valve 80 into contact with the valve restricting plate 81. Since the oil mixed into the refrigerant gas is attached to the contact portion at a time when the discharge of the refrigerant gas is thereafter finished and the discharge valve 80 is going to move toward the discharge port 7 from the valve restricting plate 81, there is a problem that the discharge valve 80 is closely attached or a negative pressure is generated in the contact portion, whereby a valve disengagement is deteriorated.

When the valve disengagement is deteriorated, the refrigerant gas flows backward to the suction chamber due to a close delay of the discharge port 7, thereby causing a reduction of a compression efficiency. However, in accordance with the present invention, since the recess portion 81g having the open front end and the circular fixed portion is provided in the head portion 81a corresponding to the maximum area portion of the valve restricting plate 81 with which the discharge valve 80 is brought into contact, it is possible to well apply a back pressure to the valve cover 80a of the discharge valve 80 by the gas introduced from the front end of the recess portion 81g. Further, due to the back pressure, the discharge valve 80 can easily move apart from the contact surface of the valve restricting plate 81.

Accordingly, since it is possible to improve a response of the discharge valve 80, it is possible to increase a compression efficiency of a whole of the refrigerant compressor. In this case, the same effect can be obtained in the case that the shape of the recess portion 81g is a U shape having an open front end.

Figure 5:
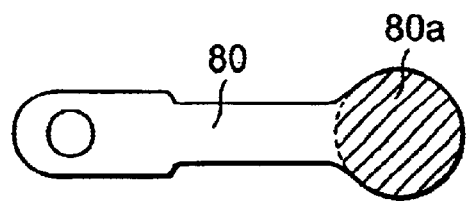
FIG. 5 is a view showing a shape of a discharge valve of a refrigerant compressor in accordance with an embodiment of the present invention.

Further, it is recommended to set an area of the through hole 81a, or the recess portion 81d or 81g, or the notch 81f provided in the head portion 81a of the valve restricting plate 81 in accordance with the present invention mentioned above to a range between 3% and 50% of an area of the valve cover 80a portion in the discharge valve 80 shown in FIG. 5. This means that in the case of setting the area of the valve cover 80a portion to 100 mm$^2$ and forming the valve cover 80a portion in the circular shape, a diameter thereof corresponds to about 2 mm to 8 mm. By applying the back pressure to the valve cover 80a with the corresponding area to the diameter 2 mm or more, it is possible to sufficiently obtain the valve disengaging property apart from the contact surface, and it is possible to keep a strength of the valve restricting plate 81 without increasing the thickness by setting to the corresponding area to the diameter 8 mm or less. Accordingly, since it is possible improve a response of the discharge valve 80, it is possible to increase the compression efficiency of the whole of the compressor.

Further, it is recommended that the through hole 81$c$, or the recess portion 81$d$ or 81$g$, or the notch 81$f$ provided in the head portion 81$a$ of the valve restricting plate 81 in accordance with the present invention mentioned above is formed by being press molded from the side of the contact surface in the discharge valve 80. If the convex portion exists on the contact surface of the valve restricting plate 81 at a time when the discharge valve 80 is brought into contact therewith, an excessive stress is generated in the discharge valve 80 due to the contact with a local portion at the front end of the convex portion, whereby there is fear that a disadvantage is generated due to breakage. However, since a shear drop is generated around the contact surface by press molding from the side of the contact surface and an angle formed with respect to the contact surface is rounded, it is possible to prevent the convex shape from being generated on the contact surface, and it is possible to easily manufacture the contact surface smoothly warped up from the intermediate portion restricting an opening amount of the discharge valve 80 at a high accuracy and with a good workability.

Further, the embodiments of the discharge valve apparatus mentioned above are shown as the embodiments applied to the rotary type compressor, however, the structure is not limited to this, and can be applied to a scroll type refrigerant compressor or a reciprocating type refrigerant compressor.

As described above, in accordance with the present invention, in the refrigerant compressor provided with the discharge port constructed in the member forming the compression chamber, the discharge vale formed in the reed shape and constituted by the valve cover portion for opening and closing the discharge port at one end and the fixed portion at another end, and the substantially rectangular valve restricting plate closely fixed to a member forming the compression chamber together with the fixed portion of the discharge valve and restricting the opening amount of the side of the valve cover portion, since the head portion wider than the middle portion of the valve restricting plate is provided in the valve restricting plate in the side with which the valve cover portion of the discharge valve is brought into contact, and the circular through hole is provided in the head portion, it is possible to well apply a back pressure to the valve cover of the discharge valve. Accordingly, the discharge valve can easily move apart from the contact surface of the valve restricting plate, and it is possible to obtain an effect of improving the response of the discharge valve.

Further, in accordance with the present invention, in the refrigerant compressor provided with the discharge port constructed in the member forming the compression chamber, the discharge vale formed in the reed shape and constituted by the valve cover portion for opening and closing the discharge port at one end and the fixed portion at another end, and the substantially rectangular valve restricting plate closely fixed to a member forming the compression chamber together with the fixed portion of the discharge valve and restricting the opening amount of the side of the valve cover portion, since the head portion wider than the middle portion of the valve restricting plate is provided in the valve restricting plate in the side with which the valve cover portion of the discharge valve is brought into contact, and the circular recess portion and the small hole extending from the recess portion to an opposite side to the contact surface are provided in the side of the contact surface of the head portion, it is possible to well apply a back pressure to the valve cover of the discharge valve. Accordingly, the discharge valve can easily move apart from the contact surface of the valve restricting plate, and it is possible to obtain an effect of improving the response of the discharge valve.

Further, in accordance with the present invention, in the refrigerant compressor provided with the discharge port constructed in the member forming the compression chamber, the discharge vale formed in the reed shape and constituted by the valve cover portion for opening and closing the discharge port at one end and the fixed portion at another end, and the substantially rectangular valve restricting plate closely fixed to a member forming the compression chamber together with the fixed portion of the discharge valve and restricting the opening amount of the side of the valve cover portion, since the head portion wider than the middle portion of the valve restricting plate is provided in the valve restricting plate in the side with which the valve cover portion of the discharge valve is brought into contact, and the U-shaped notch having the open front end is provided in the head portion, it is possible to well apply a back pressure to the valve cover of the discharge valve. Accordingly, the discharge valve can easily move apart from the contact surface of the valve restricting plate, and it is possible to obtain an effect of improving the response of the discharge valve.

Further, in accordance with the present invention, in the refrigerant compressor provided with the discharge port constructed in the member forming the compression chamber, the discharge vale formed in the reed shape and constituted by the valve cover portion for opening and closing the discharge port at one end and the fixed portion at another end, and the substantially rectangular valve restricting plate closely fixed to a member forming the compression chamber together with the fixed portion of the discharge valve and restricting the opening amount of the side of the valve cover portion, since the head portion wider than the middle portion of the valve restricting plate is provided in the valve restricting plate in the side with which the valve cover portion of the discharge valve is brought into contact, and the recess portion having the front end open to the side of the contact surface and the circular shape in the side of the fixed portion is provided in the head portion, it is possible to well apply a back pressure to the valve cover of the discharge valve. Accordingly, the discharge valve can easily move apart from the contact surface of the valve restricting plate, and it is possible to obtain an effect of improving the response of the discharge valve.

Further, in accordance with the present invention, since the area of the through hole, or the recess portion or the notch in the head portion of the valve restricting plate is set to the range between 3 and 50% of the area of the valve cover portion in the discharge valve, it is possible to well apply a back pressure to the valve cover of the discharge valve, and it is possible to improve the response of the discharge valve. Accordingly, it is possible to increase a compression efficiency of a whole of the compressor.

Further, in accordance with the present invention, since the through hole, or the recess portion or the notch in the head portion of the valve restricting plate is formed by being press molded from the side of the contact surface in the discharge valve, it is possible to prevent a convex shape from being generated on the contact surface, and it is possible to easily manufacture the contact surface of the valve restricting plate smoothly warped up from the intermediate portion for restricting the opening amount of the discharge valve at a high accuracy and with a good workability.

What is claimed is:

1. A refrigerant compressor comprising:

a discharge port constructed in a member forming a compression chamber;

a discharge reed valve having a valve cover portion for opening and closing said discharge port at one end and a fixed portion at another end that is fixed to said member forming said compression chamber; and a valve restricting plate fixed to said member forming said compression chamber together with said fixed portion of said discharge reed valve for restricting an opening amount of said valve cover portion of said discharge reed valve relative to said discharge port, said valve restricting plate having a head portion wider than a middle portion thereof with said head portion opposing said valve cover portion of said discharge valve against which said valve cover portion is brought into contact, and a through hole having an area in a range between 3 and 50% of the area of said valve cover portion of said discharge valve provided in said head portion of said valve restricting plate to provide back pressure flow communication to said valve cover portion of said discharge reed valve to move said valve cover portion away from said valve restricting plate.

2. A refrigerant compressor comprising:

a discharge port constructed in a member forming a compression chamber;

a discharge reed valve having a valve cover portion for opening and closing said discharge port at one end and a fixed portion at another end; and a valve restricting plate closely fixed to said member forming said compression chamber together with said fixed portion of said discharge valve and restricting an opening amount of said valve cover portion, wherein a head portion wider than a middle portion of said valve restricting plate is provided in said valve restricting plate, said head portion having one side with which a side of said valve cover portion of said discharge valve is brought into contact, and a circular recess portion in said one side and a hole extending through said restricting plate head portion in the area of said recess.

3. A refrigerant compressor comprising:

a discharge port constructed in a member forming a compression chamber;

a discharge reed valve having a valve cover portion for opening and closing said discharge port at one end and a portion at another end that is fixed to said member forming said compression chamber; and a valve restricting plate fixed to said member fanning said compression chamber together with said fixed portion of said discharge valve and restricting an opening amount of said valve cover portion of said discharge reed valve relative to said discharge port, said valve restricting plate having a head portion wider than a middle portion with said head portion opposing said valve cover portion of said discharge valve against which said valve cover plate can be brought into contact, and a U-shaped notch having an open front end provided in said head portion of said valve restricting plate to provide back pressure flow communication to said valve cover portion of said discharge reed valve to move said valve cover portion away from said valve restricting plate.

4. A refrigerant compressor comprising:

a discharge port constructed in a member forming a compression chamber;

a discharge reed valve having a valve cover portion for opening and closing said discharge port at one end and a fixed portion at another end that is fixed to said member forming said compression chamber; and a valve restricting plate fixed to said member forming said compression chamber together with said fixed portion of said discharge reed valve for restricting an opening amount of said valve cover portion of said discharge reed valve relative to said discharge port, said valve restricting plate having a head portion wider than a middle portion thereof against which said valve cover portion of said discharge valve is brought into contact, the surface of said head portion of said valve restricting plate facing said valve cover portion having a recess portion in the form of a circular shaped recess with an open front end to admit back pressure flow into said recess to act against said valve cover portion to move it away from said head portion of said valve restricting plate of said valve cover portion.

5. A refrigerant compressor as claimed in any one of claims 2, 3 or 4, wherein an area of said through hole, or the recess portion or the notch in said head portion of said valve restricting plate is in a range between 3 and 50% of area of said valve cover portion of said discharge valve.

6. A refrigerant compressor as claimed in any one of claims 1, 2, 3 or 4, wherein said through hole, or said recess portion or said notch in said head portion of said valve restricting plate is formed by being press molded from the side of the contact surface of said discharge valve.

* * * * *

UNITED STATES PATENT AND TRADEMARK OFFICE
CERTIFICATE OF CORRECTION

PATENT NO. : 6,679,688 B2
DATED : January 20, 2004
INVENTOR(S) : Takashi Sato et al.

It is certified that error appears in the above-identified patent and that said Letters Patent is hereby corrected as shown below:

<u>Title page,</u>
Please add:
-- [30] Foreign Application Priority Data
February 14, 2001 (JP) ................PR 2001036955 --

Signed and Sealed this

Eighth Day of June, 2004

JON W. DUDAS
*Acting Director of the United States Patent and Trademark Office*